United States Patent [19]
Breu et al.

[11] Patent Number: 4,791,526
[45] Date of Patent: Dec. 13, 1988

[54] MOUNT OF A PRINTED CIRCUIT BOARD ARRANGED IN A BIPARTITE HOUSING

[75] Inventors: Karl Breu, Groebenzell; Herbert Hoher, Germering, both of Fed. Rep. of Germany

[73] Assignee: Siemens Aktiengesellschaft, Berlin and Munich, Fed. Rep. of Germany

[21] Appl. No.: 85,369

[22] Filed: Aug. 14, 1987

[30] Foreign Application Priority Data

Sep. 4, 1986 [DE] Fed. Rep. of Germany ....... 3630196

[51] Int. Cl.⁴ .............................................. H05K 7/12
[52] U.S. Cl. ................. 361/398; 174/138 D; 361/399; 379/428; 379/433
[58] Field of Search ........................ 361/399, 398, 395; 174/138 D, 138 G; 379/429, 433, 428

[56] References Cited

U.S. PATENT DOCUMENTS

| | | | |
|---|---|---|---|
| 3,356,904 | 12/1967 | Yonkers | 361/399 X |
| 3,627,930 | 12/1971 | Tolman | 379/433 X |
| 3,947,984 | 4/1976 | Winrown | 174/138 D X |
| 4,167,772 | 9/1979 | Baehne | 174/138 D X |
| 4,291,202 | 9/1981 | Adams et al. | 379/433 X |

FOREIGN PATENT DOCUMENTS

WP85/03613 8/1985 PCT Int'l Appl. .
277156 1/1953 Switzerland ........................ 379/433

OTHER PUBLICATIONS

Telecom Report No. 2, 1984, pp. 141-146, "Siemens miniset 200—ein Kompaktfernsprecher fur uberall."

Primary Examiner—R. R. Kucia
Attorney, Agent, or Firm—Hill, Van Santen, Steadman & Simpson

[57] ABSTRACT

The invention is directed to a mount of a resiliently elastic, planar printed circuit board in a housing having a curved shape and composed of two parts. The end regions of the printed circuit board are secured such that a temporary positional change of the printed circuit board is impossible. This is achieved by having at least one resilient fastening element in the form of a shackle projecting from one of the housing parts overlaping the printed circuit board and/or pressing thereagainst in interlocking fashion at least one end region of the printed circuit board. The shackle has a length such that the printed circuit board conforms to a shape adapted to the shape of the housing part accepting it.

6 Claims, 1 Drawing Sheet

U.S. Patent  Dec. 13, 1988  4,791,526
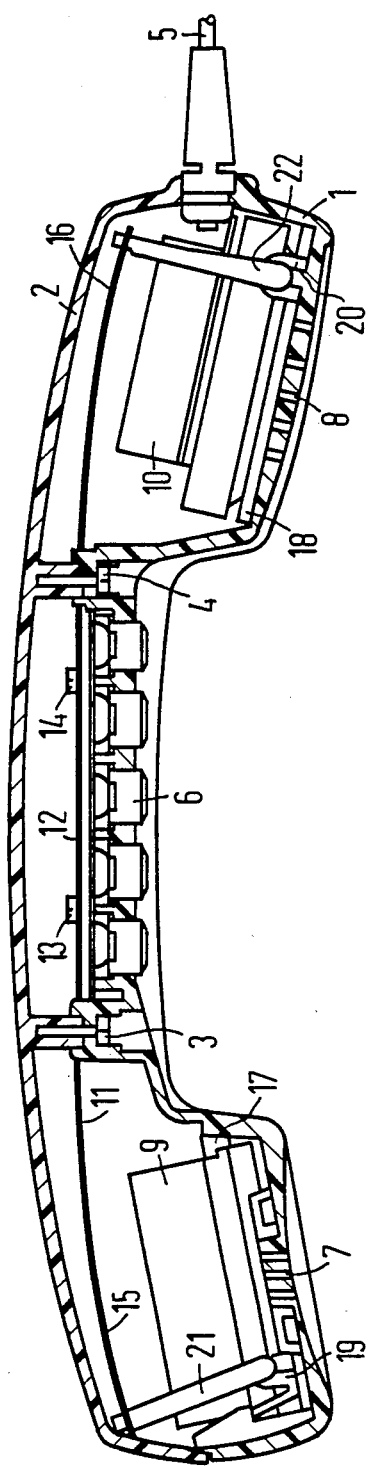
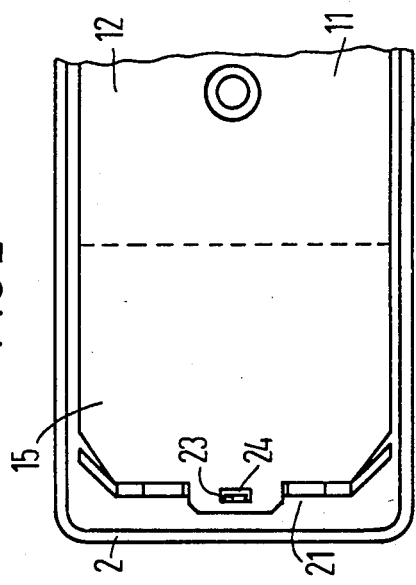
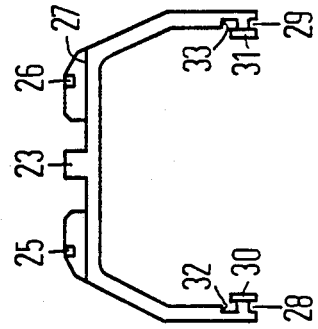
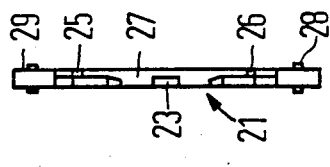

MOUNT OF A PRINTED CIRCUIT BOARD ARRANGED IN A BIPARTITE HOUSING

BACKGROUND OF THE INVENTION

1. Field of the Invention

The invention is directed to a mount of a resiliently elastic, planar printed circuit board in a housing comprising a curved shape and composed of two parts, particularly in a handset member for telephone equipment.

2. Description of the Prior Art

Printed circuit boards usually comprise a planar shape in order to be able to undertake manufacture and equipping in automatic machines in a simpler way.

Particularly in a modern handset of telephone technology which, for example, can comprise a dial means as well as further function keys, natural limits are placed on the available space due to the prescribed size of the handset member. For acoustical reasons, the handset member comprises a curved shape. When a planar printed circuit board is then to be arranged therein, either the thickness of the handset member must be enlarged, this deteriorating manipulation, or the printed circuit board must be bent off at least in its end regions toward the transducer sides.

A curved printed circuit board comprising such a bent shape is known from a compact telephone. In its normal condition, the printed circuit board is planar. In its integrated condition, however, the printed circuit board lies against one of the housing parts of the handset member under prestress, so that the printed circuit board has a curved shape corresponding in shape to that of the handset member.

It has now been shown that this embodiment is not always adequate to prevent a lift-off of the printed circuit board from the pre-stressed location given sudden movements of the handset. The consequence thereof is a transmission of clicking noises, particularly onto the microphone, this having a disturbing effect on the transmission quality of telephone calls.

SUMMARY OF THE INVENTION

An object of the invention is to secure the end regions of a printed circuit board arranged between housing parts such that a temporary positional change of the end regions of the printed circuit board is impossible.

Fastening with screws or the like, however, cannot come into consideration when components such as electro-acoustical transducers are situated under the end regions, since these must be seated in the housing decoupled from structure-borne sound, for example, by means of elastic rings, and fastening thereto is excluded.

The stated object is then achieved by the invention in that at least one resilient fastening element projecting from one of the housing parts overlaps at least one end region of the printed circuit board in at least one end region of said printed circuit board and/or presses thereagainst in interlocking fashion, whereby the fastening element comprises such a length in the fastening region that the printed circuit board comprises a shape adapted in accord with the curved shape of the housing part which accepts it.

The printed circuit board is thus lent a curved shape in the non-assembled condition of the housing parts such that it no longer presses against the other housing part in the assembled condition. For example, the fastening element can be part of the lower housing part on which the printed circuit board is also arranged. It can thus be fashioned as an injection-molded web attached to the lower housing part.

In order to achieve an increase in the stability or strength, it can be expedient that the resilient fastening elements are fastened as a shackle comprising resilient properties. The movement of the element is thus made more difficult at least by one degree of freedom.

An especially advantageous fashioning derives in that the shackle comprises an applied tab at its middle web which engages into a recess of the printed circuit board; and in that a respective catch nose as well as a detent distanced from the printed circuit board in accord with the thickness of the printed circuit board are provided at the end regions thereof.

In order to be secured in position, thus, the printed circuit board can have its end regions pressed down, whereby the end regions bend off, the tab engages into a recess of the printed circuit board and the catch nose prevents movement of the end regions in an opposite direction. The detent limits the prestress of the printed circuit board and defines the curvature of the end regions of the printed circuit board. The end region can be released in that the catch noses are successively pressed away from the clamping location, whereby the catch locations are released and an end region upwardly detaches from the tab.

It can be expedient in some applications when the shackle is pivotably held in the housing. Given a relased end region of the printed circuit board, access to other components, for example to the terminal locations of the transducers, is thus facilitated.

In order to avoid modifications at the housing, it is expedient that the shackle is arranged in arcuate bearing eyelets of a retaining member of a transducer. The bearing eyelets are stressed for tension in the clamped condition of the printed circuit board, so that a reliable fastening of the shackle is achieved.

In order to enable a release of the shackle from the bearing eyelets, it is expedient that the bearing eyelets are opened at one side facing toward the floor of the housing. As a result of this arrangement, the shackle cannot detach on its own. It can only be removed from the housing in common with the transducer mount.

In order to facilitate the pre-assembly of the transducer mount together with the shackle, it is expedient that the shackle includes a shoulder in the region of the bearing eyelets, this shoulder on the outside contour of the bearing eyelet. The shackle can thus be removed from the transducer mount only in a single position pivoted by about 90° from the normal position.

BRIEF DESCRIPTION OF THE DRAWINGS

Let the invention be set forth in greater detail below with reference to four figures. Shown are:

FIG. 1 is a cross-section through a handset, whereby only the essential parts are shown.

FIG. 2 is a plan view of the inside of the lower housing part of the handset.

FIG. 3 is a shackle in plan view.

FIG. 4 is the shackle of FIG. 3 in elevation.

DESCRIPTION OF THE PREFERRED EMBODIMENTS

The handset member of FIG. 1 is composed of a lower housing part 1 as well as of an upper housing part 2 connected thereto. The two parts are connected to one another with screws 3,4. A handset cord 5 may be seen at one end of the handset member. A dial means 6 formed by a key field is arranged in the middle part of the lower housing part 1. Sound passages 7, 8 are further provided in the lower housing part 1, the electroacoustical transducer being arranged following these in the inside of the lower housing part. Thus, a telephone receiver 9 is situated behind the sound passages 7 and a telephone transmitter 10 is situated behind the sound passages 8. An unequipped printed circuit board 11 may also be seen in the inside between the housing parts 1 and 2, a central region 12 of this printed circuit board being planarly fashioned and screwed to the lower housing part with screws 13, 14. Free end regions 15, 16 of the printed circuit board 11 are situated over the telephone receiver and transmitter 9, 10. Retaining members 17, 18 by means of which the telephone receiver and transmitter are held may then be seen in these regions. These retaining members each include a U-shaped bearing eyelet 19, 20 open at one side, including these at each of both sides. The bearing eyelets serve for the acceptance of a shackle 21, 22 which is pivotably arranged therein.

At that side facing away from the bearing location, each shackle is in communication with a respective end region of the printed circuit board and pulls it into the intended, curved position under pre-stress.

FIG. 2 shows a part of the inside of the lower housing part. The shackle 21 includes a tab 23 in its middle region which ends in a recess 24 of the printed circuit board 11.

As further shown by FIGS. 3 and 4, the shackle includes two catch noses 25, 26 as well as a detent 27. The end region 15 of the printed circuit board 11 interlocks behind these catch noses. Male bearing members 28, 29 may also be seen in FIGS. 3 and 4. Shoulders 30, 31 prevent the male bearing members from detaching from the bearing eyelets on their own. Further shoulders 32, 33 provide that the shackle can only be detached from the bearing eyelets in a position which deviates from the use position.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A mount of resiliently elastic, planar printed circuit board in a housing having a curved shape and composed of two parts, comprising at least one resilient fastening element in the form of a shackle, pivotably held on the housing and projecting from one of the housing parts overlaping at least one end region of the printed circuit board in at least one end region of the printed circuit and pressing thereagainst in interlocking fashion, the fastening element having such a length in its fastening region that the printed circuit board is urged into a shape correspondingly adapted to the curved shape of the housing part accepting it.

2. A mount according to claim 1, wherein the shackle comprises a tab applied to its middle web, this tab engaging into a recess of the printed circuit board; and in that a respective catch nose as well as a detent distanced therefrom in accord with the thickness of the printed circuit board are provided at each of the end regions thereof.

3. A mount according to claim 1, wherein the shackle is arranged in arcuate bearing eyelets of a retaining member of a transducer.

4. A retaining member according to claim 3, wherein the bearing eyelets are open at one side facing away from said printed circuit board.

5. A retaining member according to claim 4, wherein the shackle comprises a shoulder in the region of the bearing eyelets, said shoulder sliding on the outside contour of the bearing eyelet.

6. A mount for a resiliently elastic, planar printed circuit board in a housing having a curved shape and composed of two parts comprising at least one resilient fastening element in the form of a shackle, pivotably held in the housing and projecting from one of the housing parts pressing against at least one end region of the circuit board, the fastening element having such a length in its fastening region that the printed circuit board is urged into a shape correspondingly adapted to the curved shape of the housing part accepting it.

* * * * *